United States Patent Office 3,079,332
Patented Feb. 26, 1963

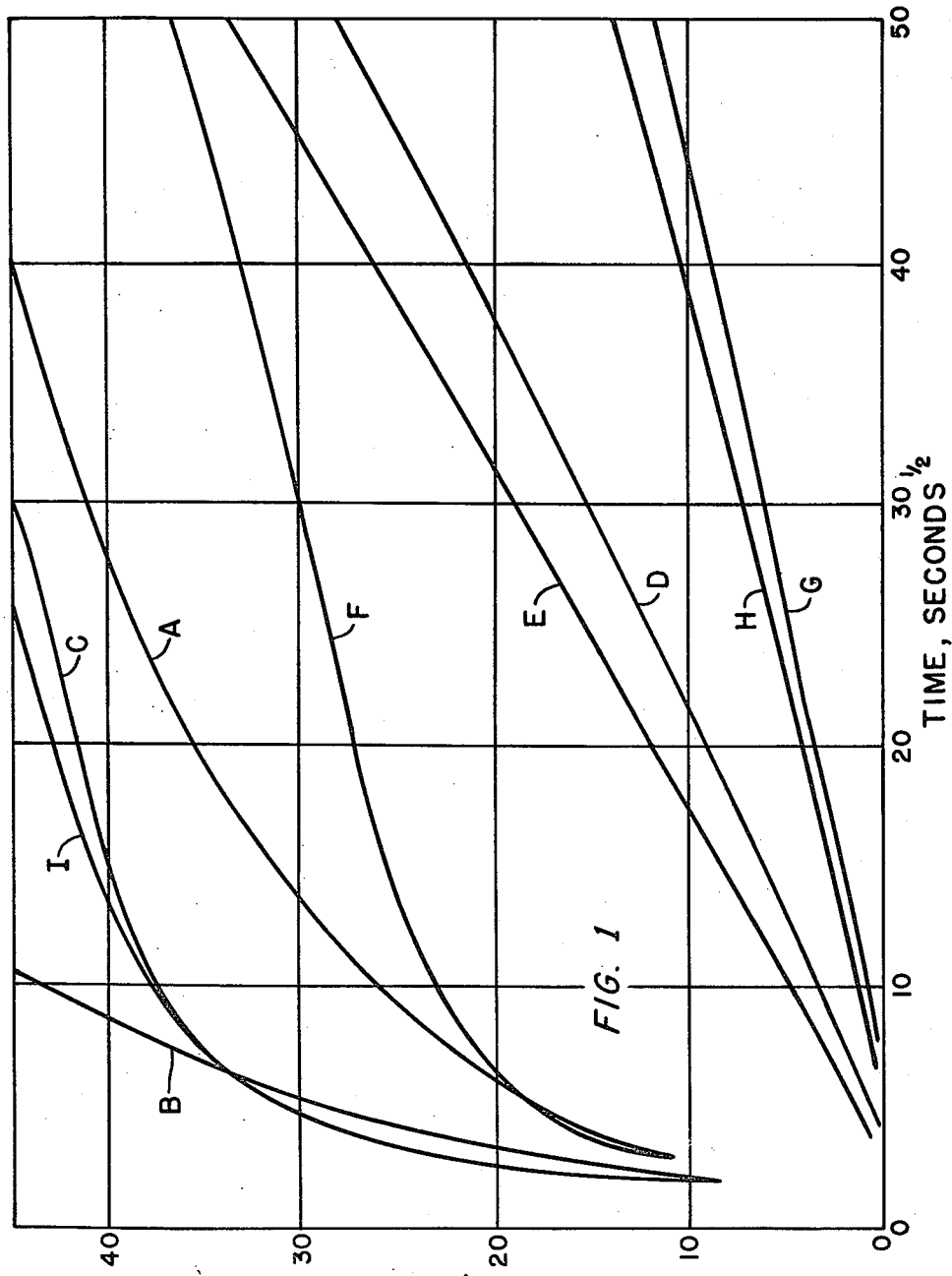

3,079,332
METHOD AND COMPOSITION FOR
REDUCING FLUID LOSS
Reece E. Wyant, Dallas, Tex., assignor to The Atlantic
Refining Company, Philadelphia, Pa., a corporation of
Pennsylvania
Filed July 23, 1957, Ser. No. 673,608
4 Claims. (Cl. 252—8.5)

The present invention relates to novel water-loss control agents, aqueous compositions containing such agents, and methods of temporarily plugging permeable earth formations employing such compositions. This invention is particularly concerned with aqueous fluids containing novel water-loss control agents adapted to reduce the rate of filtration of such aqueous fluids into or through permeable, subsurface earth formations and with methods of temporarily plugging permeable, subsurface earth formations employing such fluids.

Although the present invention will be illustrated and particularly described with relation to the treatment of subsurface earth formations in the petroleum production industry, it is to be understood that the novel composition disclosed and claimed herein may be used in other arts within it is desired to temporarily consolidate or plug permeable earth masses in order to prevent or retard the flow of water or other aqueous fluids into or through such masses.

In the oil and gas production art, water or aqueous fluids are employed in a number of processes in which it is highly desirable that the water or aqueous fluids have a retarded tendency to filter into or through the pores of a subsurface earth formation. Typical examples of such processes include formation fracturing operations and drilling operations utilizing water-base drilling fluids.

In the art of formation fracturing, it is known that the permeability to fluids of a subsurface earth formation can be substantially increased by creating or opening fractures in the formation of interest and, thereafter, depositing solid, particle-form propping agent in the fracture to hold it open. Ordinarily, this operation is carried out by disposing a fluid in the well bore opposite the formation to be treated and applying a pressure to such fluid sufficient to create fractures in the formation or to enlarge existing fractures. As a general rule, this step is carried out without the addition of a fluid-loss agent to the fluid employed. However, in some cases in which highly permeable formations are treated or pumping capacity is limited, it is desirable to employ a fluid having a retarded tendency to filter into the formation. Following this creation or enlarging of a fracture, a solid, particle-form propping agent is suspended in a second fluid and sufficient pressure is applied to the suspension to force it into the fracture and deposit the propping agent therein. In this step of a fracturing operation, it is generally desirable to use a fluid which has been treated to reduce its tendency to lose fluid into the pores of the formation and to increase its ability to suspend solid propping agents. Following the deposition of the propping agent in the fracture, production of fluids from the formation or injection of fluids into formation is carried out according to conventional practices. Where a fluid is employed in fracturing operations which has been treated with a fluid-loss agent not readily dissolved in the particular formation fluids or injection fluids, it is sometimes necessary to inject a solvent which will dissolve or disperse the filtercake formed by the fluid-loss agent following deposition of propping agent in the fracture. Recently, the practice of employing water or other aqueous fluids, as opposed to hydrocarbon fluids, in such fracturing operations has increased considerably and the volume of such fluids employed in a single treatment has also increased. Accordingly, it is highly desirable that economical fluid-loss agents be provided for use in such operations.

The desirability of employing fluids of low fluid loss in drilling operations will also be evident from a brief review of such operations. In the drilling of a well bore, it is customary to circulate around the drill in the well bore a fluid which serves the three-fold purpose of lubricating the drill bit, carrying cuttings and chips out of the well bore, and forming an impermeable filtercake on the walls of the well bore. This filtercake serves to prevent the walls of the well bore from caving, renders the well bore substantially impermeable to the infiltration of extraneous fluids and prevents loss of water from the drilling fluid and consequent excessive thickening of the fluid. Accordingly, to aid in the formation of the filtercake it is customary to add to the drilling fluid a fluid-loss retarder having the ability to form a filtercake in a relatively short period of time.

Heretofore a number of water-loss control agents have been proposed for use in these enumerated operations as well as others. Such agents include inorganic or organic hydrophile colloids. Among the inorganic colloidal materials heretofore suggested are colloidal clays, hydroxides of polyvalent metals, silicic acid, aluminates or other salts capable of swelling with water or of forming liquid crystals. The organic colloidal material include polysaccharides, such as cellulose or starch, gum arabic, agar-agar, lipoides, proteins, such as casein or albumen, and organic dyestuffs and the like.

In most cases, these prior art fluid-loss agents have the disadvantage of failing to reduce water loss to the extent desired regardless of the amount used, or excessive amounts of such agents are required in order to attain the desired water-loss reduction. Thus, these materials are comparatively expensive when employed in oil and gas production operations. In addition, it is also known that the water-loss reducing properties of a majority of these materials are adversely affected by high temperatures, and if such agents are employed in quantities sufficient to combat high temperature degradation the viscosity of the resultant fluid is so high that the fluid is difficult to pump.

It is, therefore, an object of the present invention to provide an improved fluid-loss agent for water or aqueous fluids.

Another object of the present invention is to provide an improved method and composition for carrying out fracturing operations wherein an aqueous fluid having improved water-loss properties is employed.

Still another object of the present invention is to provide an improved method and composition for drilling well bores into subsurface earth formations wherein a drilling fluid having a reduced tenency to lose water to the formations is employed.

A further object of the present invention is to provide a novel water-loss control agent which is stable under high temperature conditions.

Still another object of the present invention is to provide a novel water-loss control agent which does not unduly viscify the fluid.

Other and further objects and advantages of the present invention will be apparent from the following description and FIGURE 1 of the drawings which is a plot of fluid loss vs. the square root of time for various aqueous fluids containing the individual ingredients of this invention and various combinations thereof.

The term "aqueous fluids" as used herein is meant to include any fluid system containing water in significant quantities, such as true solutions, suspensions, emulsions and the like.

In accordance with the present invention, it has been found that a novel composition for controlling fluid loss in aqueous fluids can be prepared by combining a polyorganic compound, having the hereinafter specified structure, a boron compound, and a material selected from the group consisting of organic and inorganic hydrophile colloids.

It has also been found that water or other aqueous fluids, such as emulsions in which water is the external phase, can be converted into fluids having improved solids-suspending properties and fluid-loss characteristics by the addition of the novel composition of this invention thereto.

The polyorganic compounds contemplated herein are compounds having at least one reactive unit consisting of two adjacent hydroxyl groups arranged in a "cis" configuration. In those instances in which the solids-suspending properties of the treated fluid are important, the polyorganic compound is desirably one having a high molecular weight, since, to some extent, the molecular weight of this base compound will determine the ability of the fluid to suspend solids. Particular polyorganic compounds falling within this class are guar gum and locust bean gum.

By way of illustration, guar gum is essentially a straight chain polymer of mannose units linked in a 1–4 beta glucosidic linkage and having galactose branching on alternate mannose units. This particular material has an average molecular weight of about 220,000. The established structure of the guar gum molecule may be illustrated as follows:

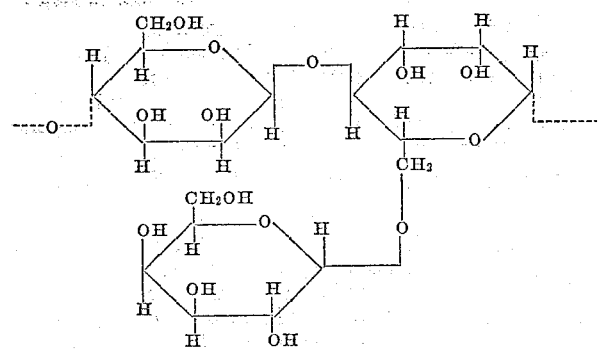

Boron compounds suitable for use in accordance with the instant invention include any boron compound which will supply borate ions in an aqueous fluid; for example, boric acid, sodium biborate, potassium tetraborate, sodium tetraborate (borax), and the like.

Although it has not been definitely established whether the borate ions form a chemical compound with the polyorganic compounds of this invention or whether a complex is formed, it has been established that the borate ions act as a bonding agent between molecules of such polyorganic compounds. In any event, this bonding will be referred to herein as the formation of a complex and may be illustrated by the following type reaction:

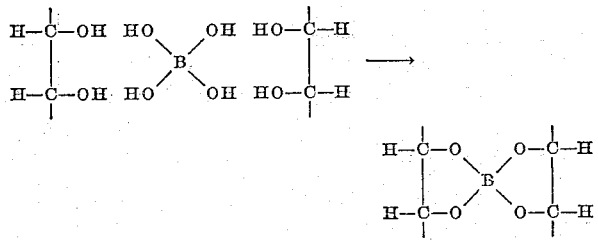

Organic and inorganic colloidal materials suitable for use in accordance with this invention include any of those colloidal materials heretofore utilized as water-loss control agents and include those materials specifically referred to above.

Again, it has not been established what form of bonding or inner action takes place between borax-treated polyorganic compounds and the colloidal material. It may be theorized, however, that a hydrogen bonding takes place or that the colloidal material simply forms a coating about the molecules of the complex. In any event, a definite synergistic effect has been observed when the borax-treated polyorganic compound is combined with a colloidal material.

In a typical method of preparing aqueous fluids containing the water-loss agent of this invention, the desired quantity of polyorganic compound is dissolved in water, the pH adjusted to the basic side, preferably between pH 8.5 and 12, a suitable boron compound is added in an amount equal to about 3 percent of the quantity of polyorganic compound, and finally the colloidal material is added. This procedure may be varied by preparing a concentrate of the fluid-loss agent in water and then diluting the concentrate, adding a concentrate to a conventional drilling fluid or by forming the water-loss agent in the drilling fluid. In addition, the sequence of steps may be altered so long as the three major ingredients are present.

The synergistic effect produced by the combination of ingredients taught by the present invention can be illustrated by a group of fluid-loss tests carried out on aqueous fluids containing the individual ingredients and various combinations thereof. In this series of tests, an aqueous fluid containing the hereinafter specified amounts of the individual ingredients of this invention, various combinations of these ingredients, and the synergistic composition of the present invention were prepared as set forth above, utilizing a conventional drilling fluid starch (pregelatinized corn starch), guar gum and borax as the active ingredients. These fluids were then tested in accordance with A.P.I. procedure RP No. 29, third edition, May 1950 (tentative).

The fluid-loss properties measured in accordance with the specified A.P.I. procedure are plotted as curves A through I, inclusive, of FIGURE 1. The standard A.P.I. fluid loss in 30 minutes, the temperature of testing, and the ingredients and amounts of each fluid-loss additive are set forth in Table I below.

*Table I*

| Curve | Starch Concentration, Lb./Bbl. | Gum Concentration, Percent by Weight | Borax Treated | Testing Temp., °F. | API Fluid Loss, cc. in 30 Minutes |
|---|---|---|---|---|---|
| A | 6 | | No | 75 | 45.6 |
| B | 3 | | No | 75 | 1 88 |
| C | 3 | | No | 150 | 49.2 |
| D | | .25 | Yes | 75 | 27.6 |
| E | | .25 | Yes | 150 | 23.0 |
| F | 3 | .25 | No | 75 | 35.0 |
| G | 3 | .25 | Yes | 75 | 9.4 |
| H | 3 | .25 | Yes | 150 | 11 |
| I | | .35 | No | 75 | 52 |

1 (15 minutes).

It is to be observed from the data contained in Table I and the curves of FIGURE 1 that the use of starch alone results in an aqueous fluid having a comparatively high fluid loss. It was also found in a similar test that the addition of borax to a fluid containing starch in equivalent amounts failed to change the fluid-loss characteristics of the untreated starch-containing fluid. Similarly, guar gum which was not treated with borax resulted in a fluid loss approximately equal to that resulting from the use of starch alone. Borax-treated guar gum was found to be substantially better than untreated guar gum or untreated starch but still had a comparatively high fluid loss. A fluid containing both starch and guar gum but which was not treated with borax also exhibited high fluid-loss characteristics as illustrated by curve F of FIGURE 1. On the other hand, the combination of starch, guar gum and borax resulted in extremely low fluid-loss characteristics which were substantially better than one would expect from the additive effects of starch and borax-treated guar gum. In addition, the three component system was found to be highly stable at 150° F. since there was only a small increase in the fluid loss over the fluid loss measured at 75° F.

It is also interesting to note in FIGURE 1 that the fluids containing gum and borax or the combination of these materials with starch were substantially superior to starch alone or gum alone during the early stages of the test. This is particularly significant since in many aqueous compositions it is highly desirable that the fluid loss characteristics during the early stages of use be comparatively low rather than exhibit rapid fluid loss during the initial period of use and thereafter level out.

Water treated with the composition of curves G and H, in the amounts specified, has been found to be an excellent fluid for use in fracturing operations, either as the initial fluid used to create or enlarge fractures or as the fluid used to carry propping agents, such as sand, into a fracture. Although the quantities and relative amounts shown are preferred in fracturing fluids, these proportions may be varied to meet the conditions encountered in a specific application. Generally, the polyorganic compound may be used in amounts between about 0.1 and 1.0 percent by weight of the total fluid while the colloidal material may be used in amounts within the range of about 1 to 16 pounds per barrel of total fluid.

A typical water-base drilling fluid may be made by incorporating in a conventional mud-laden fluid up to one percent of the polyorganic compound, adjusting the pH, adding a boron compound, and finally incorporating from one to about sixteen pounds per barrel of colloidal material. These drilling fluids may be weighted, if necessary, for use in drilling through strata having such high fluid pressures as would blow a column of unweighted fluid out of the bore. Weighting may be accomplished by adding to the drilling fluid any of the commonly used weighting agents; such as, calcium chlorode, iron oxide, or barytes, to provide a mixture having the desired specific gravity.

It should also be pointed out that the plugging or filtercake producing effects of the fluid loss agents of the present invention may be readily reduced where it is desired to remove the material or regain the initial permeability or porosity of the earth formation. This may be accomplished in several ways. For example, it has been found that simply adjusting the pH of the fluid to the acid side will break down the filtercake formed by the composition. Accordingly, when it is desired to remove the filtercake from the formation treated, acidizing the formation in the well known manner will bring about this result. It is also possible to incorporate in the treating fluid an inhibitedd acid which will take effect after a predetermined period of time. It is also known that the filtercake or gel-forming abilities of the polyorganic compounds employed in the present invention may be reduced by the action of certain enzymes. In some cases, enzyme-forming bacteria are present in the formation treated and will take effect when the fluid is allowed to remain in the formation for a considerable period of time. Suitable enzyme-forming bacteria may also be added to the treating fluid since the enzyme action takes a comparatively long period of time to affect the gel-forming ability of the polyorganic compounds.

It will be apparent to those skilled in the art that various modifications of the combinations and methods particularly referred to herein may be made without departing from the present invention which is limited only in accordance with the appended claims.

I claim:
1. In a method for drilling a well bore in a subsurface formation wherein an aqueous drilling fluid normally subject to rapid filtration through the pores of the formation is employed, the improvement comprising adding to an aqueous drilling fluid between 0.1 and 1.0% by weight of water of an organic compound selected from the class consisting of guar gum and locust bean gum, sufficient boron compound capable of supplying enough borate ions to react with said organic compound and capable of maintaining free borate ions in said fluid, and sufficient alkaline fluid to raise the pH of said fluid to above 8.0, and between 1 and 16 pounds of starch per barrel of said aqueous drilling fluid, and circulating said aqueous drilling fluid about the drill bit.

2. The method in accordance with claim 1 wherein the amount of boron compound is at least 3% by weight of the organic compound.

3. In a method for providing lateral flow channels in a subsurface formation wherein an aqueous fracturing fluid normally subject to rapid filtration through the pores of the formation is employed, the improvement comprising adding to an aqueous fracturing fluid between 0.1 and 1.0% by weight of water of an organic compound selected from the class consisting of guar gum and locust bean gum, sufficient boron compound capable of supplying enough borate ions to react with said organic compound and capable of maintaining free borate ions in said fluid, and sufficient alkaline fluid to raise the pH of said fluid to above 8.0, and bewteen 1 and 16 pounds of starch per barrel of said aqueous fracturing fluid, and forcing said aqueous solution into said formation.

4. The method in accordance with claim 3 wherein the amount of boron compound is at least 3% by weight of the organic compound.

References Cited in the file of this patent

UNITED STATES PATENTS

| | | |
|---|---|---|
| 2,006,426 | Weiler | July 2, 1935 |
| 2,122,483 | Menaul | July 5, 1939 |
| 2,208,766 | Lawton | July 23, 1940 |
| 2,348,484 | Lawton | May 9, 1944 |
| 2,364,434 | Foster | Dec. 5, 1944 |
| 2,452,021 | Wayne | Oct. 19, 1948 |
| 2,483,936 | Roberts | Oct. 4, 1949 |
| 2,525,783 | Farrow | Oct. 17, 1950 |
| 2,576,955 | Ludwig | Dec. 4, 1951 |
| 2,582,191 | Curtis | Jan. 8, 1952 |
| 2,644,765 | Frisch et al. | July 7, 1953 |
| 2,681,704 | Menaul | June 22, 1954 |
| 2,801,218 | Menaul | July 30, 1957 |
| 2,854,407 | Mallory | Sept. 30, 1958 |

OTHER REFERENCES

Deuel et al.: The Reaction of Boric Acid and Borax with Polysaccharides, article in Chemical Abstracts, vol. 43, 1949, col. 6986.

Haug: Guar Mannogalactan Studies, article in Tappi, January 1953, vol. 36, No. 1, pages 53 and 54.

Rogers: Compositions and Properties of Oil Well Drilling Fluids, 1953, Gulf Publishing Co. of Houston, Tex., revised ed., pages 414–415.